US008314779B2

(12) United States Patent
Chan et al.

(10) Patent No.: US 8,314,779 B2
(45) Date of Patent: Nov. 20, 2012

(54) METHOD AND APPARATUS FOR OPERATING A TOUCH PANEL

(75) Inventors: Wing Chi Stephen Chan, Kowloon (HK); Wai Pak Choi, Tai Po (HK); Wai Kin Cheng, Tsuen Wan (HK); Kwok Wah Chu, Kowloon (HK); Siu Hong Lui, Tai Koo Shing (HK); Yao Lu, Guangzhou (HK); Wai Hon Ng, Cho Yiu Estate (HK)

(73) Assignee: Solomon Systech Limited, Shatin, New Territories (HK)

( * ) Notice: Subject to any disclaimer, the term of this patent is extended or adjusted under 35 U.S.C. 154(b) by 750 days.

(21) Appl. No.: 12/390,637

(22) Filed: Feb. 23, 2009

(65) Prior Publication Data

US 2010/0214232 A1    Aug. 26, 2010

(51) Int. Cl.
  *G06F 3/045* (2006.01)
(52) U.S. Cl. ........................................ 345/174
(58) Field of Classification Search .................. None
  See application file for complete search history.

(56) References Cited

U.S. PATENT DOCUMENTS

| | | | |
|---|---|---|---|
| 4,587,630 A | 5/1986 | Straton et al. | |
| 5,615,384 A | 3/1997 | Allard et al. | |
| 5,745,116 A | 4/1998 | Pisutha-Arnond | |
| 6,310,610 B1 | 10/2001 | Beaton et al. | |
| 6,580,442 B1 | 6/2003 | Singh et al. | |
| 7,911,456 B2 * | 3/2011 | Gillespie et al. | 345/174 |
| 7,932,896 B2 * | 4/2011 | Westerman | 345/173 |
| 2006/0066588 A1 * | 3/2006 | Lyon et al. | 345/173 |
| 2006/0097991 A1 | 5/2006 | Hotelling et al. | |
| 2006/0242607 A1 | 10/2006 | Hudson | |
| 2007/0109274 A1 * | 5/2007 | Reynolds | 345/173 |
| 2007/0257890 A1 | 11/2007 | Hotelling et al. | |
| 2007/0276525 A1 | 11/2007 | Zadesky et al. | |
| 2008/0062147 A1 * | 3/2008 | Hotelling et al. | 345/174 |
| 2008/0284739 A1 * | 11/2008 | Andrews et al. | 345/173 |
| 2009/0135153 A1 * | 5/2009 | Narusawa | 345/173 |
| 2010/0060608 A1 * | 3/2010 | Yousefpor | 345/174 |

* cited by examiner

*Primary Examiner* — Joseph Haley
(74) *Attorney, Agent, or Firm* — Finnegan, Henderson, Farabow, Garrett & Dunner, LLP

(57) ABSTRACT

A controller for detection of touches by a single finger or multiple fingers on a touch panel, the touch panel including a first group of electrodes arranged in a first direction and a second group of electrodes arranged in a second direction, thereby forming a plurality of crossover points. The controller includes: a plurality of signal drivers coupled to the first group of electrodes and configured to excite the first group of electrodes sequentially using a spread spectrum signal; a plurality of signal sensors coupled to the second group of electrodes and configured to detect peaks and troughs of capacitive coupled signals at the second group of electrodes, the detecting being performed simultaneously for the crossover points along a current one of the first group of electrodes that is being excited; and a signal processing device configured to detect the touches on the touch panel and to determine touch positions and touch movements, based on the detected peaks and troughs of the capacitive coupled signals.

23 Claims, 17 Drawing Sheets

1st Jitter Sequence

2nd Jitter Sequence

METHOD AND APPARATUS FOR OPERATING A TOUCH PANEL

FIELD OF THE INVENTION

This invention relates to methods and apparatus for operating a capacitive touch panel.

BACKGROUND OF THE INVENTION

There are a multitude of input devices for accepting user inputs to operate electronic machines. For example, a keyboard is a common input device based on a fixed key definition and key position. A mouse is another common input device, used as a controller of a cursor, for performing the function of a selector or a pointer. Ergonomic considerations have revealed that restrictive and repetitive finger movements may become a professional hazard, as in intensive use of the keyboard and the mouse over a long period.

A touch panel or screen has emerged as an alterative means for a user to input information. The touch panel has ergonomic advantages compared to the keyboard and the mouse. In addition, the touch panel may be an especially useful input device for mobile appliances such as a personal digital assistant (PDA). The touch panel provides relatively less restrictive finger movements compared to the keyboard and the mouse.

Currently, there are two types of relatively popular touch panels: a resistive type touch panel and a capacitive type touch panel. The resistive type touch panel may support a fine spatial resolution input, and it is good for handwriting input. The capacitive type touch panel may support proximity sensing, and it is good for touch control input. The capacitive type touch panel may be constructed with separate individual sensor electrodes with predefined functions to perform upon touch. Recently, the capacitive type touch panel may sense multiple touches and differentiate different touch characteristics, providing an ergonomic user interface that may detect finger touch movements.

SUMMARY OF THE INVENTION

In accordance with the invention, there is provided a controller for detection of touches by a single finger or multiple fingers on a touch panel, the touch panel including a first group of electrodes arranged in a first direction and a second group of electrodes arranged in a second direction, thereby forming a plurality of crossover points, the controller comprising: a plurality of signal drivers coupled to the first group of electrodes and configured to excite the first group of electrodes sequentially using a spread spectrum signal; a plurality of signal sensors coupled to the second group of electrodes and configured to detect peaks and troughs of capacitive coupled signals at the second group of electrodes, the detecting being performed simultaneously for the crossover points along a current one of the first group of electrodes that is being excited; and a signal processing device configured to detect the touches on the touch panel and to determine touch positions and touch movements, based on the detected peaks and troughs of the capacitive coupled signals.

Also in accordance with the invention, there is provided a method for detection of touches by a single finger or multiple fingers on a touch panel, the touch panel including a first group of electrodes arranged in a first direction and a second group of electrodes arranged in a second direction, thereby forming a plurality of crossover points, the method comprising: exciting the first group of electrodes sequentially using a spread spectrum signal; detecting, as analog signals, peaks and troughs of capacitive coupled signals at the second group of electrodes, the detecting being performed simultaneously for the crossover points along a current one of the first group of electrodes being excited; and converting the analog signals into digital data for digital signal processing, to detect the touches on the touch panel and to determine touch positions and touch movements based on the detected peaks and troughs of the capacitive coupled signals.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In exemplary embodiments consistent with the present invention, there are provided methods and apparatus for operating a capacitive touch panel, which may serve as an input device for a human-machine interface. For example, the touch panel may be a touch screen used in a portable device such as a handheld personal digital assistant (PDA) or a smart phone. Also for example, the touch panel may be an input component used in, e.g., a vending machine or an electronics learning product such as an educational toy.

Figure 1:
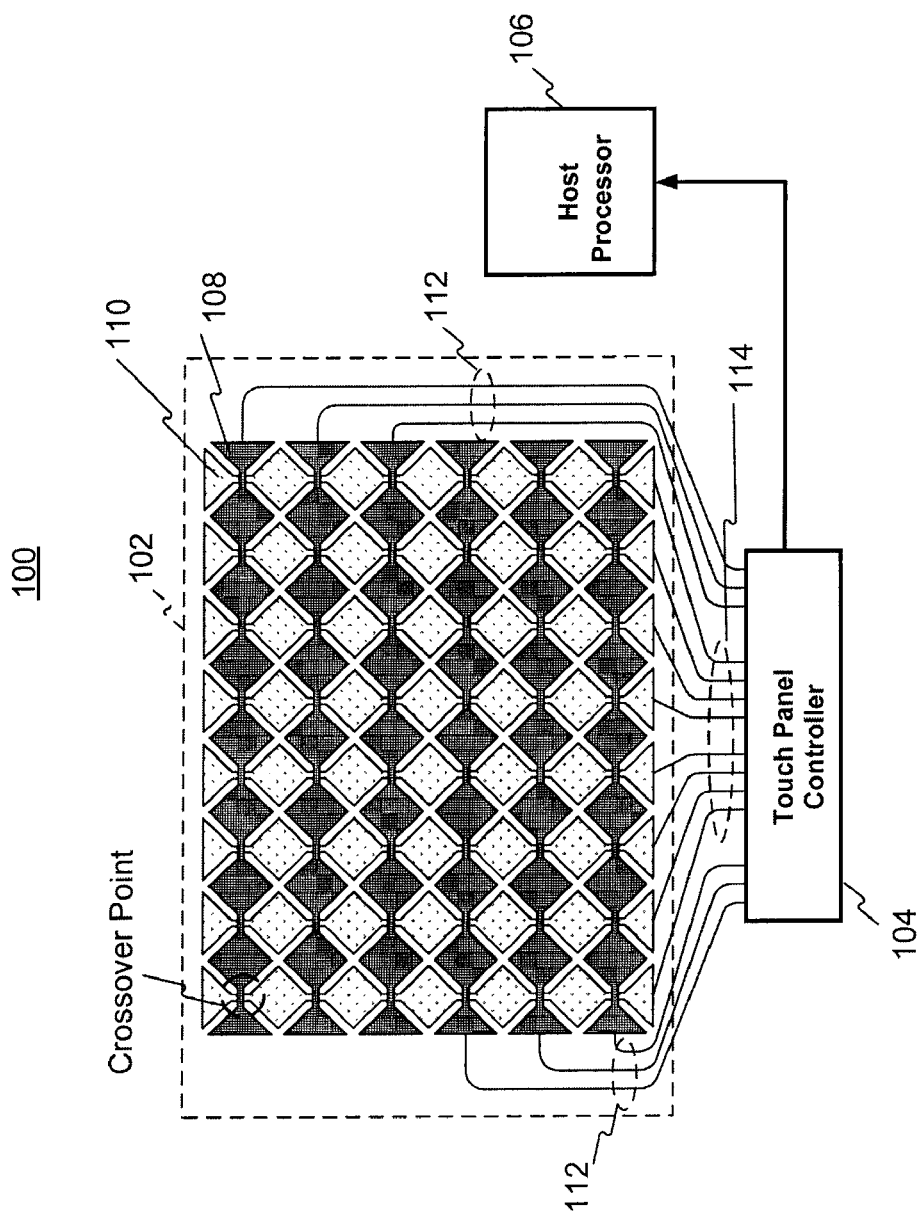
FIG. 1 illustrates a schematic diagram of a capacitive touch panel system, according to an exemplary embodiment.

FIG. 1 illustrates a schematic diagram of a capacitive touch panel system 100, according to an exemplary embodiment. The touch panel system 100 may include a capacitive touch panel 102, a touch panel controller 104, and a host processor 106. For example, the touch panel 102 may be configured to receive touches by a single finger or multiple fingers as user input. The touch panel controller 104 is configured to scan touch signals from a surface of the touch panel 102, convert the touch signals into an array of data, analyze the array of data to detect touch events, and send touch event information to the host processor 106. The host processor 106 is configured to interpret the received touch event information and perform an action based on the touch event information.

In exemplary embodiments consistent with the present invention, the touch panel 102 may include a first layer/group of electrodes 108, e.g., the horizontal electrodes represented by the shaded and vertically lined area in FIG. 1, and a second layer/group of electrodes 110, e.g., the vertical electrodes represented by the dotted area in FIG. 1. The first layer of electrodes 108 and the second layer of electrodes 110 are covered and separated by a dielectric material, and are thereby electrically isolated from each other. In addition, all electrodes in a same layer are arranged in a same direction. For example, the first layer of electrodes 108 and the second layer of electrodes 110 may be arranged perpendicular to each other to form a matrix of crossover points. In the illustrated embodiment, the electrodes each have a diamond structure that is commonly used by the industry. Alternatively, the electrodes may have a strip structure.

At each of the crossover points, a mutual capacitance is formed due to the proximity of intersecting electrodes and the dielectric material that separates and covers them. The mutual capacitance may be determined by an electric field (e-field) strength created by applying a unit potential difference between two intersecting electrodes. A permittivity of the dielectric material is a factor that may affect the e-field strength, and may be regarded as the material's ability to transmit the e-field. For example, glass has a permittivity that is seven times as large as air, and plastic has a permittivity similar to air. A change in permittivity of the dielectric material may change characteristic behaviors of the touch panel 102.

In one exemplary embodiment, the touch panel 102 may use glass as the dielectric material that separates and covers the electrodes. For example, when a person uses a finger to approach one of the crossover points, the finger may shunt off an e-field from that crossover point, due to a grounding nature of the human body, which may be considered as a virtual ground and a good alternate current (AC) ground. The shunt off of the e-field may cause a decrease in the mutual capacitance at that crossover point. In addition, the finger also acts as an e-field coupler due to a dipolar nature of water molecules in the tissues of the finger. However, because glass is already a good e-field coupler, the finger's e-field coupler effect is typically not distinct. Hence, the mutual capacitance at that crossover point may decrease when the finger touches the touch panel 102.

In one exemplary embodiment, the touch panel 102 may use plastic as the dielectric material that separates and covers the electrodes. When a person uses a finger to approach one of the crossover points, the finger may shunt off an e-field between the intersecting electrodes, and also cause an e-field coupling effect, as described above. Because a permittivity of plastic is relatively small, the e-field coupling effect from the finger is typically obvious. As a result of those two opposing effects, i.e., e-field shunting and coupling, the e-field coupling at that crossover point may be increased. Hence, the mutual capacitance at that crossover point may increase when the finger touches the touch panel 102.

Besides the dielectric material, other factors affecting the e-field strength may include a separation between the first layer of electrodes 108 and the second layer of electrodes 110, a covering material thickness for the touch panel 102, and an effective area of each of the crossover points.

Based on different applications, the electrodes of the touch panel 102 may be made of different materials. In one embodiment, the touch panel 102 is a transparent panel to be positioned in front of a display device to form a touch screen. In such an embodiment, the electrodes of the touch panel 102 may be made of indium tin oxide (ITO) on a glass substrate. In another embodiment, the touch panel 102 is a nontransparent panel, such as a touch tablet in a laptop. In such an embodiment, the electrodes may be made of copper on a fiberglass substrate.

In exemplary embodiments consistent with the present invention, the touch panel controller 104 may output driving signals to the first layer of electrodes 108 via a plurality of signal driving lines 112, and receive input of sensing signals from the second layer of electrodes 110 via a plurality of signal sensing lines 114. Under such configuration, the first layer of electrodes 108 are used as driving electrodes, and the second layer of electrodes 110 are used as sensing electrodes.

Physically, the driving electrodes and the sensing electrodes are the same, and they are all passive electrodes. Hence, alternatively, the touch panel controller 104 may output driving signals to the second layer of electrodes 110, and receive input of sensing signals from the first layer of electrodes 108. Under such configuration, the first layer of electrodes 108 are used as the sensing electrodes, and the second layer of electrodes 110 are used as the driving electrodes.

In exemplary embodiments consistent with the present invention, the touch panel controller 104 is configured to perform scanning of the whole touch panel 102, referred to herein as a frame scan, to detect finger touches on the touch panel 102 and to determine locations and movements of the touches. The touch panel controller 104 may schedule sequential excitations of the driving electrodes one at a time, and schedule, for a current one of the driving electrodes being excited, a simultaneous detection of touch signals at the sensing electrodes all at the same time.

Figure 2A:
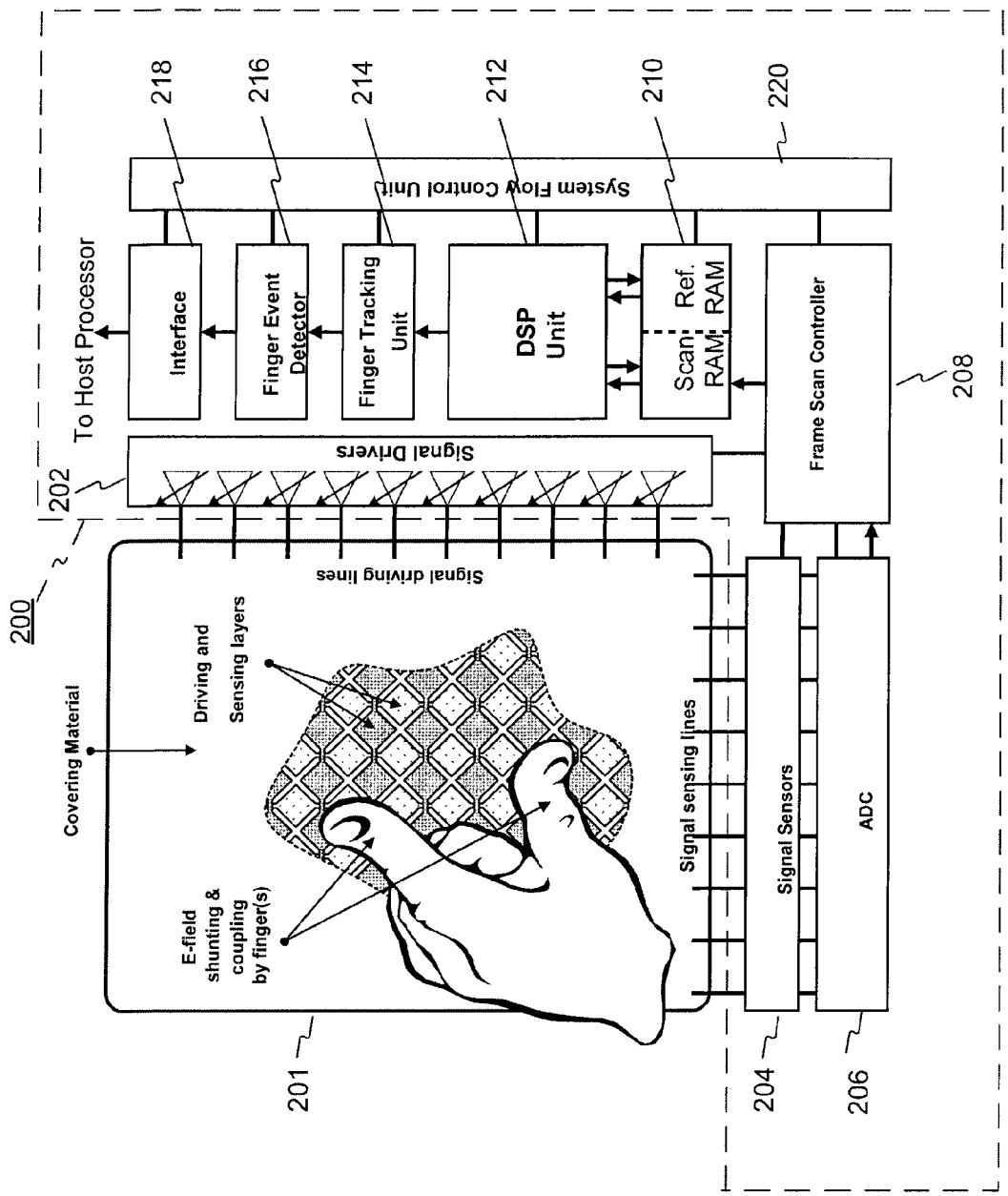
FIG. 2A illustrates a schematic diagram of a touch panel controller, according to an exemplary embodiment.

FIG. 2A illustrates a schematic diagram of a touch panel controller 200, according to an exemplary embodiment. For example, the touch panel controller 200 may be the touch panel controller 104 (FIG. 1), and be used to control a capacitive touch panel 201. The touch panel controller 200 may include a plurality of signal drivers 202, a plurality of signal sensors 204, and a signal processing device which further includes an analog to digital converter (ADC) 206, a frame scan controller 208, a memory unit 210, a digital signal processing (DSP) unit 212, a finger tracking unit 214, a finger event detector 216, and a communication interface 218. The communication interface 218 may connect to a host processor (not shown), such as the host processor 106 (FIG. 1). In addition, the touch panel controller 200 may further include a system flow control unit 220.

In exemplary embodiments consistent with the present invention, the signal drivers 202 are each configured to amplify a low voltage digital signal, such as a spread spectrum signal, to a high voltage driving signal to drive the driving electrodes of the touch panel 201. The amplification may be programmable by the host processor, which facilitates adaptation of the touch panel controller 200 to various touch panels with different sizes and different covering material thicknesses. During operation, the driving electrodes may be sequentially excited by the spread spectrum signal and generate a varying e-field following the spread spectrum signal.

The varying e-field may be coupled from the driving electrodes to the sensing electrodes of the touch panel 201. The coupled e-field may induce voltages, i.e., capacitive coupled signals, at the sensing electrodes, and peaks and troughs of the induced voltages are typically affected by presence or absence of finger touches at the crossover points.

In exemplary embodiments consistent with the present invention, the signal sensors 204 are configured to measure the induced voltages at the sensing electrodes to determine the positions of the crossover points with voltage variations, which may result from touches on the touch panel 201. Each of the signal sensors 204 may include peak detect and hold circuitry, which detects the peaks of the induced voltages, and trough detect and hold circuitry, which detects the troughs of the induced voltages. The signal sensors 204 are configured to perform the detection simultaneously for a current one of the driving electrodes that is being excited, to save time and power.

In exemplary embodiments consistent with the present invention, the ADC 206 is configured to convert the peaks and troughs, which are detected by the signal sensors 204 as analog signals, into an array of digital data. The ADC 206 may have a relatively low resolution, such as a 5-bit or 6-bit flash ADC. The reason is that the peaks and troughs analog signals are typically weak and have a low signal-to-noise ratio. A high resolution ADC may not help since the resolution is typically far below a noise floor.

On the other hand, signal peak and trough values with a relatively higher resolution, such as a 10 bit resolution, may be needed to differentiate between finger touches and no touches at the crossover points. To achieve the relatively higher resolution, the ADC 206 may use data decimation to generate digital data with an increased signal-to-noise ratio. For example, the ADC 206 may accumulate a plurality of samples of the peaks and troughs sampled at different times, to average out noise signals. Also for example, to achieve a 10-bit resolution for a 6-bit flash ADC, 32 sampling cycles per crossover point may be used.

In exemplary embodiments consistent with the present invention, the frame scan controller 208 is configured to provide accurate timing for the analog front end of the touch panel controller 200, i.e., the signal drivers 202, the signal sensors 204, and the ADC 206. The frame scan controller 208 is further configured to manipulate spread spectrum signaling, arrange the digital data as an array of scanned data into a scan random access memory (RAM) in the memory unit 210, and control the power for the analog front end. For example, the frame scan controller 208 may include a data arrangement component to organize transfer of the digital data to the scan RAM. The frame scan controller 208 may also include a scan speed regulation component to control frame scans, which will be described below.

In exemplary embodiments consistent with the present invention, the frame scan controller 208 may further include a spread spectrum generator/correlator. The spread spectrum generator is configured to generate the spread spectrum signal for the signal drivers 202. The spread spectrum generator may improve suppression of electromagnetic interference (EMI) from the driving electrodes, and enhance rejection of input noise signals at the sensing electrodes. For example, using a high voltage square wave to directly drive the driving electrodes may be a detrimental source of electromagnetic (EM) emission. Instead, the spread spectrum generator may use a spread spectrum technique to generate signal energy that is concentrated at fundamental and harmonic frequencies to be partially spread out in the frequency spectrum. As a result, the EM emission may be reduced.

In addition, the touch panel controller 200 may become less susceptible to noise signals based on the spread spectrum technique. For example, switching type voltage regulators are deployed for portable devices due to their relatively high energy conversion efficiency. However, these switching regulators may be noise sources, and switching noise may couple to nearby apparatus through power line conduction and/or EM radiation. If a switching type voltage regulator and the touch panel controller 200 have a close operating frequency, noise signals may be injected into detected data. By using the spread spectrum technique, the noise signals may be averaged out. In other words, the touch panel controller 200 becomes less susceptible to noise signals at certain frequencies.

Figure 3:
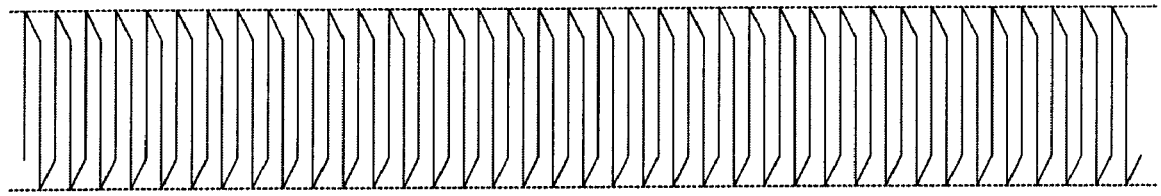
FIG. 3 illustrates exemplary jitter sequences, according to an exemplary embodiment.
Figure 3:
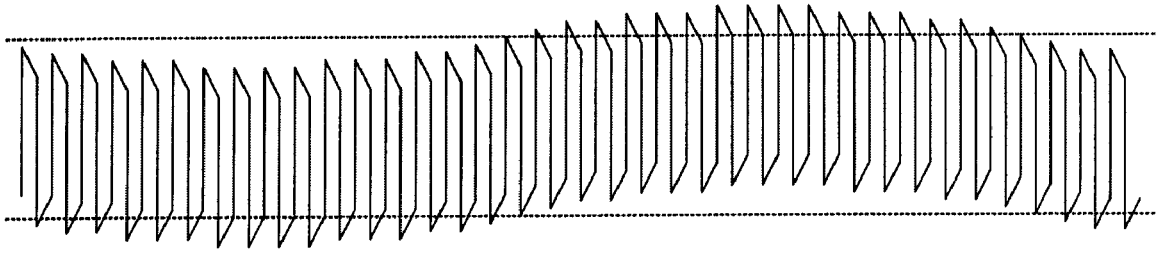

In exemplary embodiments consistent with the present invention, the spread spectrum generator is configured to generate a direct current (DC) free waveform as the spread spectrum signal to suppress DC wander. DC wander may occur when a non DC free signal passes through an AC coupled channel, and the electrodes of the touch panel 201 act as AC coupled channels. To cope with DC wander, a jitter sequence needs to be controlled. For example, FIG. 3 shows first and second exemplary jitter sequences. The first jitter sequence is indicative of the capacitive coupled signals at the sensing electrodes before being detected by the signal sensors, when the spread spectrum signal is DC free. The second jitter sequence is indicative of the capacitive coupled signals at the sensing electrodes, when the spread spectrum signal is not DC free. As shown in FIG. 3, DC wander is suppressed in the first jitter sequence, and DC wander occurs in the second jitter sequence.

Referring back to FIG. 2A, in exemplary embodiments consistent with the present invention, the memory unit 210 may include first and second RAM blocks. The first RAM block, referred to herein as a scan RAM, may store the array of scanned data, and may also be used as a working buffer for the DSP unit 212. The second RAM block, referred to herein as a reference RAM, stores an array of compensation data. For example, the reference RAM block stores mutual capacitance values of all crossover points of the touch panel 201 as the compensation data, the mutual capacitance values being calibrated at different times during system operation.

In exemplary embodiments consistent with the present invention, the DSP unit 212 may include first, second, and third DSP sub-units. The first DSP sub-unit is configured to compensate the array of scanned data in the scan RAM based on the compensation data in the reference RAM. After compensation, the array of compensated, scanned data becomes finger touch image data. For example, if the touch panel 201 is a glass touch panel, the finger touch image data may be generated by subtracting the array of scanned data in the scan RAM from the array of compensation data in the reference RAM. Also for example, if the touch panel 201 is a plastic touch panel, the finger touch image data may be generated by subtracting the array of compensation data in the reference RAM from the array of scanned data in the scan RAM.

The second DSP sub-unit is configured to identify finger touches on the touch panel 201 and calculate finger position coordinates based on the finger touch image data. For example, the second DSP sub-unit may use an image segmentation method to identify finger touches. The image segmentation method divides into groups the crossover points with induced voltage variations, which may indicate possible finger touches on the touch panel 201. Accordingly, the finger touch image data may constitute a plurality of approximate finger touch images, wherein one finger touch image corresponds to each of the groups of crossover points with the induced voltage variations. For example, a finger may touch a small area on the touch panel 201, and image segmentation may identify the corresponding group of crossover points in the small area from the finger touch image data. It is to be understood that unintended or improper touches on the touch panel 201 may occur. Such inadvertent touches may be later abandoned or ignored during processing by the finger event detector 216. The second DSP sub-unit may further apply a finger windowing technique to the approximate finger touch images to generate for each a reshaped finger image, even under a low S/N ratio condition. In addition, the second DSP sub-unit may calculate the finger position coordinates by determining a center of mass for each of the groups of crossover points. A center of mass of crossover points is defined as an average of their positions weighted by their masses. A mass of a crossover point is defined as the compensated, scanned data at that crossover point.

The third DSP sub-unit is configured to obtain the reference mutual capacitance values of the crossover points of the touch panel 201 as the compensation data during system initialization, and to fine tune the reference mutual capacitance values during system normal operation. The compensation data in the reference RAM will be updated accordingly.

In exemplary embodiments consistent with the present invention, the finger tracking unit 214 is configured to track touch movements. While the DSP unit 212 calculates the finger position coordinates based on the finger touch image data, a history of the touch movements is tracked by the finger tracking unit 214. The history of the touch movements may provide touch characteristic data to be analyzed by the finger event detector 216.

In exemplary embodiments consistent with the present invention, the finger event detector 216 is configured to detect predefined touch events for the finger touches, and to report the detected touch events to the host process via the communication interface 218. For example, a variety of touch events may be predefined by users. If the detected touch events are not predefined, they may not be reported to the host processor. User interface functions may subsequently be formulated by the host processor based on the reported touch events.

In exemplary embodiments consistent with the present invention, the touch panel controller 200 may be integrated with a graphics or display controller to form an integrated controller. For example, the communication interface 218 may be configured such that the touch panel controller 200 may be coupled to the graphics or display controller to form the integrated controller. The integrated controller may determine manipulation operations of a displayed object, which will be described in detail below.

Figure 2B:
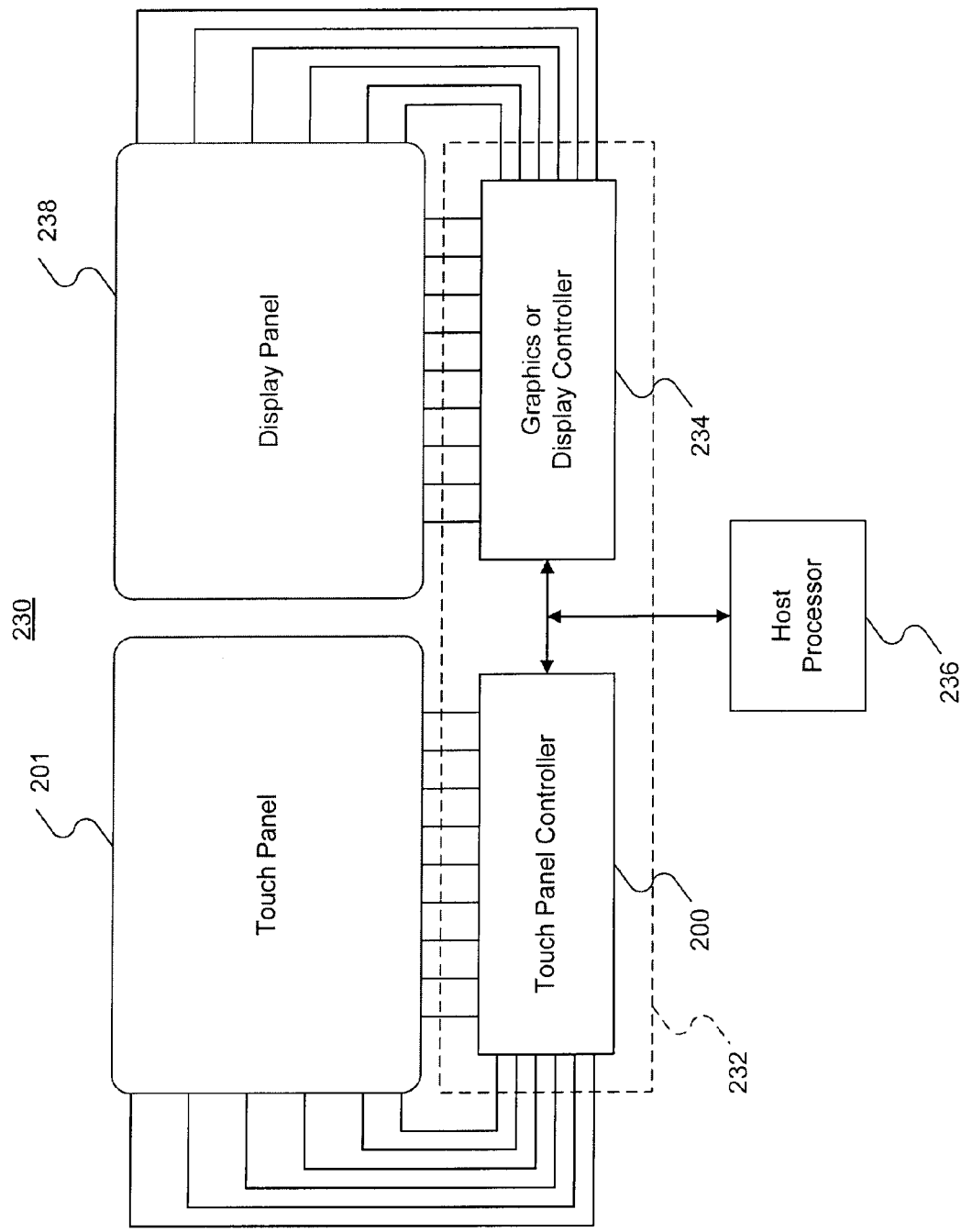
FIG. 2B illustrates a schematic diagram of a touch panel system including an integrated controller, according to an exemplary embodiment.

FIG. 2B illustrates a schematic diagram of a touch panel system 230 including an integrated controller 232, according to an exemplary embodiment. For example, the touch panel controller 200 (FIG. 2A) may be integrated with a graphics or display controller 234 to form the integrated controller 232, which is further coupled to a host processor 236. In addition, the graphics or display controller 234 may be coupled to a display panel 238 and may control the display panel 238. The touch panel 201 may be transparent and be positioned in front of the display panel 238 to form a touch screen.

Figure 4:
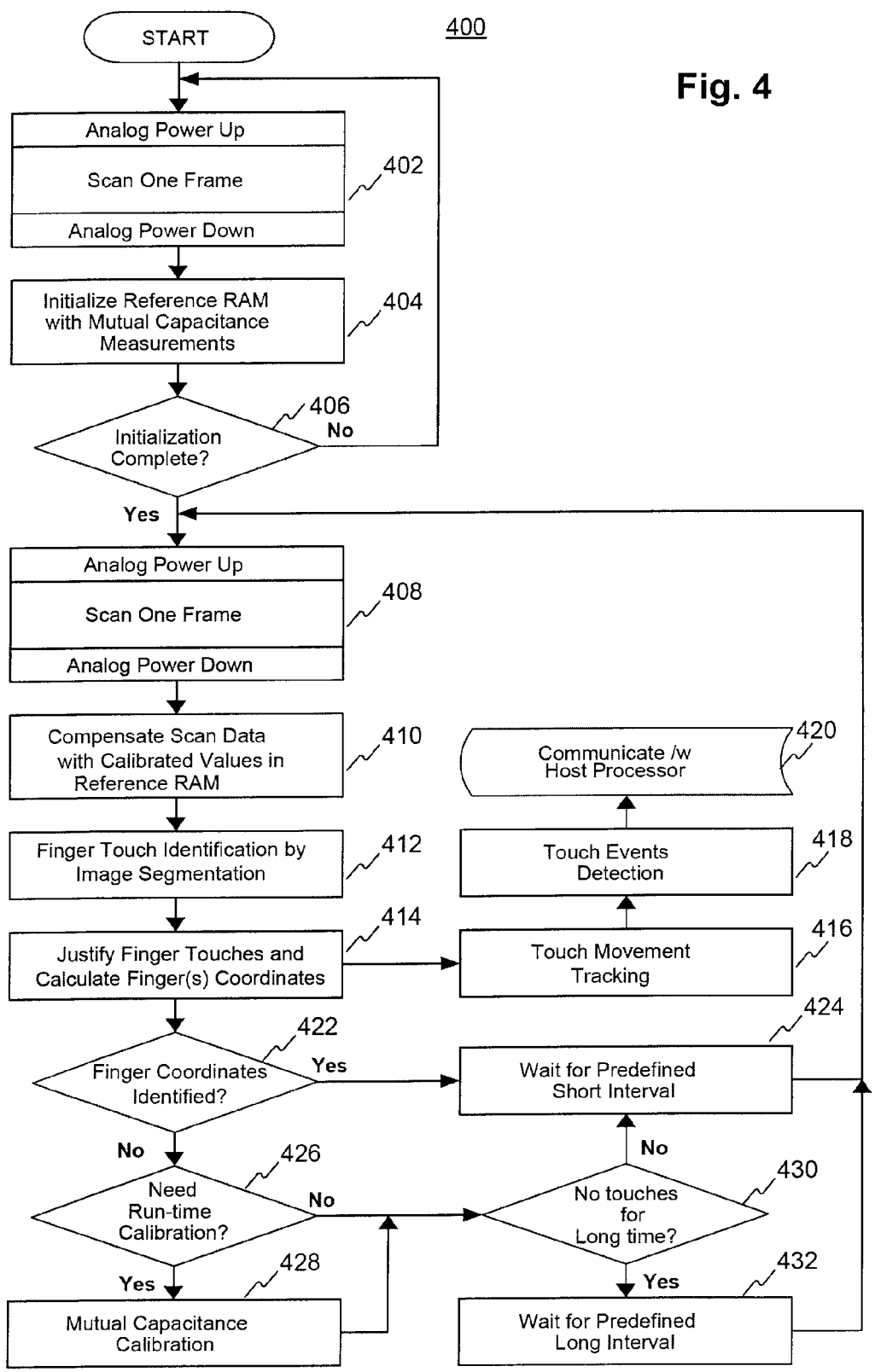
FIG. 4 illustrates a flow chart of a method for a touch panel controller to control a touch panel, according to an exemplary embodiment.

FIG. 4 illustrates a flow chart of a method 400 for the touch panel controller 200 (FIG. 2A) to control the touch panel 201 (FIG. 2A), according to an exemplary embodiment. Referring to FIGS. 2A and 4, the system flow control unit 220 may execute overall system flow control of the other above-described components of the touch panel controller 200, in accordance with the method 400. During initialization, the touch panel controller 200 may perform a plurality of frame scans of the touch panel 201 to generate calibrated mutual capacitance data. For example, the analog front end, i.e., the signal drivers 202, the signal sensors 204, and the ADC 206, may operate to measure the mutual capacitance values of the crossover points during each frame scan (402). The reference RAM in the memory unit 210 is initialized by recording the measured mutual capacitance values into the reference RAM (404). The measured mutual capacitance values from the plurality of frame scans may then be used to average out background noise signals and generate the calibrated mutual capacitance data as the compensation data.

In exemplary embodiment consistent with the present invention, the analog front end may be powered up only during each of the frame scans to save power. Since the touch panel 201 needs to be driven and sensed at a relatively higher voltage compared with the low voltage digital end, such as the frame scan controller 208 and the DSP unit 212, the analog front end may consume most of the power used by the touch panel controller 200. Therefore, by powering up the analog front end only during each of the frame scans, power may be saved. As shown in step 402 in FIG. 4, each of the frame scans is preceded by an analog power up procedure to power up the analog front end, and is succeeded by an analog power down procedure to power down the analog front end.

After each frame scan, the touch panel controller 200 determines whether the initialization is complete (406). If the touch panel controller 200 determines that the initialization is not complete (406—No), the touch panel controller 200 continues to perform the frame scans, until the touch panel controller 200 determines that the initialization is complete (406—Yes). After the initialization, the touch panel controller 200 enters normal operation.

In exemplary embodiments consistent with the present invention, the front end, i.e., the signal drivers 202, the signal sensors 204, and the ADC 206, operate to perform a frame scan of the touch panel 201 (408). As described above, power may be saved by powering up the analog front end only during each frame scan. Therefore, as shown in step 408 in FIG. 4, the frame scan is preceded by an analog power up procedure to power up the analog front end, and is succeeded by an analog power down procedure to power down the analog front end.

In exemplary embodiments consistent with the present invention, the scanned data may be stored into the scan RAM. The DSP unit 212 may further compensate the scanned data with the calibrated mutual capacitance data stored in the reference RAM (410). The DSP unit 212 may also perform finger touch identification by performing image segmentation on the compensated data (412). The DSP unit 212 may further justify finger touches, i.e., determine whether there is any finger touch on the touch panel 201, and calculate finger position coordinates if it is determined that there are finger touches (414). In other words, the DSP unit 212 may identify finger touches and corresponding finger position coordinates. The DSP unit 212 may further send the finger position coordinates to the finger tracking unit 214.

The finger tracking unit 214 may then track touch movements based on the calculated finger position coordinates (416), and send a history of the touch movements to the finger event detector 216. The finger event detector 216 may detect predefined touch events for the finger touches based on the history of the touch movements (418), and report the detected touch events to the host processor (420).

In exemplary embodiments consistent with the present invention, the frame scan controller 208 determines whether finger touches and corresponding finger position coordinates have been identified (422). In addition, the system flow control unit 220 may use a frame counter to count a number of frame scans that occurred without detected finger touches. If the frame scan controller 208 determines that finger touches and corresponding finger position coordinates are identified (422—Yes), the frame scan controller 208 waits for a relatively short, predefined interval before starting a next frame scan (424), and the frame counter is reset to zero.

If the frame scan controller 208 determines that finger touches and corresponding finger position coordinates are not identified (422—No), the frame scan controller 208 may further determine whether mutual capacitance calibration is needed (426). For example, the determination may be based on the number of frame scans that occurred without detected finger touches. If the number of frame scans that occurred without detected finger touches is larger than a multiple of a predefined number, calibration may be carried out (428).

In addition, the frame scan controller 208 may determine whether it has been a long time since the last detection of finger touches (430). For example, the determination may also be based on the number of frame scans that occurred without detected finger touches. If the frame scan controller 208 determines that it is has been a long time since the last detection of finger touches (430—Yes), the frame scan controller 208 waits for a relatively long, predefined interval before starting the next frame scan (432). Otherwise (430—No), the frame scan controller 208 waits for the relatively short, predefined interval before starting the next frame scan (424).

In exemplary embodiments consistent with the present invention, the relatively short interval (424) and the relatively long interval (432) may be user programmable, to control a frame scan speed for different applications. Different frame scan speeds may be used to optimize power usage. For example, a scan speed of around 30 frames per second is good enough for a command button type graphic user interface (GUI). On the other hand, a scan speed of 80 frames per second or higher may be needed for sketching or detailed drawing with the touch panel 201. Because the relatively long interval is longer than the relatively short interval, the frame scan speed will drop when no finger is touching the touch panel 201 after a short period of time. This self-adaptive scan speed scheme may further save power without sacrifice of the human-machine interface responsiveness and functionality of the touch panel 201.

In exemplary embodiments consistent with the present invention, the touch events may be triggered by touch incidents. The touch events and the touch incidents are collectively referred to herein as touch characteristic constructs. Based on the touch events, user-defined interface functions may subsequently be formulated by the host processor or by other data processing means such as a dedicated graphics controller.

In exemplary embodiments consistent with the present invention, the touch incidents are primitives or elements that have the potential of triggering a touch event. The touch incidents may be divided into three types: a finger enter incident, a finger hold incident, and a finger leave incident.

For example, a finger enter incident is identified when a new finger position is detected in a majority of a consecutive number of scan frames, e.g., at least three out of five consecutive scan frames. When a finger touches the touch panel 201, the finger enter incident is triggered.

Also for example, a finger hold incident is identified when finger positions are detected in a majority of a consecutive number of scan frames, e.g. at least three out of five consecutive scan frames, after a finger enter incident has been identified. When the finger is touching or moving along the surface of the touch panel 201 over a period of time, a sequence of finger hold incidents may be triggered and the finger positions are periodically reported to the host processor until a finger leave incident is identified.

Further for example, a finger leave incident is identified when a finger position is not detected in a majority of a consecutive number of scan frames, e.g., at least four out of five consecutive scan frames, after a finger enter incident or a finger hold incident has been identified. When the finger is withdrawn from the touch panel 201, no finger position is reported and a finger leave incident is triggered.

In exemplary embodiments consistent with the present invention, the touch panel controller 200 (FIG. 2A) may include a set of registers for user-defined tolerance periods and position tracking tolerances. Minor changes occurring within or outside these tolerances may be disregarded to provide a filtering of glitches or inadvertent data that in general occurs at the human-machine interface, to accordingly be adaptive to the desired application of interface functions.

In exemplary embodiments consistent with the present invention, triggered by the touch incidents, the touch events may be queued in an event stack. The touch events are governed by the user-defined tolerance periods and position tracking tolerances.

In one exemplary embodiment, a single click event may be detected for a single finger. For example, the touch panel controller 200 may send information regarding a single click event to the host processor, if the touch panel controller 200 identified a finger enter incident followed by a finger leave incident within a user-defined tolerance period. In this manner, when the finger touches the touch panel 201 once, the touch panel controller 200 may detect a single click event.

In one exemplary embodiment, a double click event may be detected for a single finger. For example, the touch panel controller 200 may send information regarding a double click event to the host processor, if the touch panel controller 200 identified a first finger enter incident followed by a first finger leave incident, and a second finger enter incident followed by a second finger leave incident within a user-defined tolerance period. In this manner, when the finger touches the touch panel 201 twice, the touch panel controller 200 may detect a double click event.

In one exemplary embodiment, a directional enter event may be detected for first and second fingers. For example, the touch panel controller 200 may send information regarding a directional enter event to the host processor, if the touch panel controller 200 identified finger enter incidents triggered by first and second fingers at positions $(x1, y1)$ and $(x2, y2)$, respectively, within a user-defined tolerance period. The slope of a line formed by the two finger positions $(x1, y1)$ and $(x2, y2)$ is then calculated and classified as one of four possible directions, including a horizontal direction, a vertical direction, a diagonal sloping downward direction, and a diagonal sloping upward direction. In this manner, when the two fingers touch the touch panel 201, the touch panel controller 200 may detect a directional enter event including the direction information.

In one exemplary embodiment, a directional click event may be detected for first and second fingers. For example, the touch panel controller 200 may send information regarding a directional click event to the host processor, if the touch panel controller 200 identified finger enter incidents triggered by the first and second fingers at positions $(x1, y1)$ and $(x2, y2)$, respectively, followed by finger leave incidents triggered by the first and second fingers within a user-defined tolerance period. The slope of a line formed by the two finger positions (x1, y1) and (x2, y2) is calculated and classified as one of four possible directions, including a horizontal direction, a vertical direction, a diagonal sloping downward direction, and a diagonal sloping upward direction. In this manner, when the two fingers touch the touch panel 201, the touch panel controller 200 may detect a directional click event including direction information.

In one exemplary embodiment, a drag event may be detected for a single finger. For example, the touch panel controller 200 may send information regarding a drag event to the host processor, if the touch panel controller 200 identified a finger enter incident at a position (x, y) followed by a consecutive number of finger hold incidents with a change in the finger position ($\Delta x$, $\Delta y$). The direction of the drag event may be determined by the change in the finger position ($\Delta x$, $\Delta y$), and be classified as one of four possible directions, including a horizontal direction, a vertical direction, a diagonal sloping downward direction, and a diagonal sloping upward direction. When the finger drags on the touch panel 201, the touch panel controller 200 may detect a drag event, which includes the direction information and adjustment information indicative of application values, such as a panning distance, a zooming magnitude, an image brightness, or a sound loudness, for controlling user-defined interface functions.

In one exemplary embodiment, a directional drag event may be detected for first and second fingers. For example, the touch panel controller 200 may send information regarding a directional drag event to the host processor, if the touch panel controller 200 identifies finger enter incidents triggered by the first and second fingers at positions (x1, y1) and (x2, y2), respectively, followed by a consecutive number of finger hold incidents with changes in the finger positions ($\Delta x1$, $\Delta y1$) and ($\Delta x2$, $\Delta y2$) for the first and second fingers, respectively. The direction determined from the finger positions, the drag direction and drag magnitude, and the separation between the two fingers may be used to control user-defined interface functions.

The above-described touch characteristic constructs are non-exclusive examples, and other touch characteristic constructs may also be defined to meet implementation and application requirements. In particular, touch primitives and events may be extended to more than two fingers and to multiple concurrent users. These touch characteristic constructs may be configured to actuate a large variety of user-defined interface functions. Examples below are described in terms of three-dimensional (3D) graphic applications, and two-dimensional (2D) graphic applications may be regarded as implicit defaults when ignoring a third dimension.

In exemplary embodiments consistent with the present invention, the touch panel controller 200 may have built-in touch characteristic constructs to support 3D computer graphics in a touch-based user interface. Manipulation operations may further allow a user to manipulate a computer graphic directly by placing a touch in the proximity of a displayed object, and moving the touch to implement a desired change to the object. The displayed object may be a 3D widget, a 3D window, or a 3D popup menu, which are all applicable for mobile devices. In addition, a set of user friendly manipulation operations may be chosen to be easy to use. Furthermore, optional visual indicators may be shown on the display as menu guides upon detection of touch characteristic constructs. These visual indicators are temporarily displayed and are removed upon a trigger by a finger leave incident. The display of these visual indicators may be dependent on display technologies.

In addition, for a 3D visualization system, different types of coordinate systems may be used. An affine transformation of a displayed 3D object may be used to change a position, a rotation angle, and an axis dimension of the object, based on a coordinate system for 3D manipulation operations. For example, coordinate systems may be divided into four types of space, that is, screen space, world space, parent space, and local space. The screen space is the space of x-axis/y-axis extending along the screen and z-axis extending through the plane of the screen. The world space is an absolute coordinate system. The parent space is a space that is hierarchically one level above an entity's local space. The local space is a local coordinate system. In the illustrated embodiments, the screen space is used for illustrative purposes only. The method described here is extendable to other coordinate systems according to a desired application.

Figure 5:
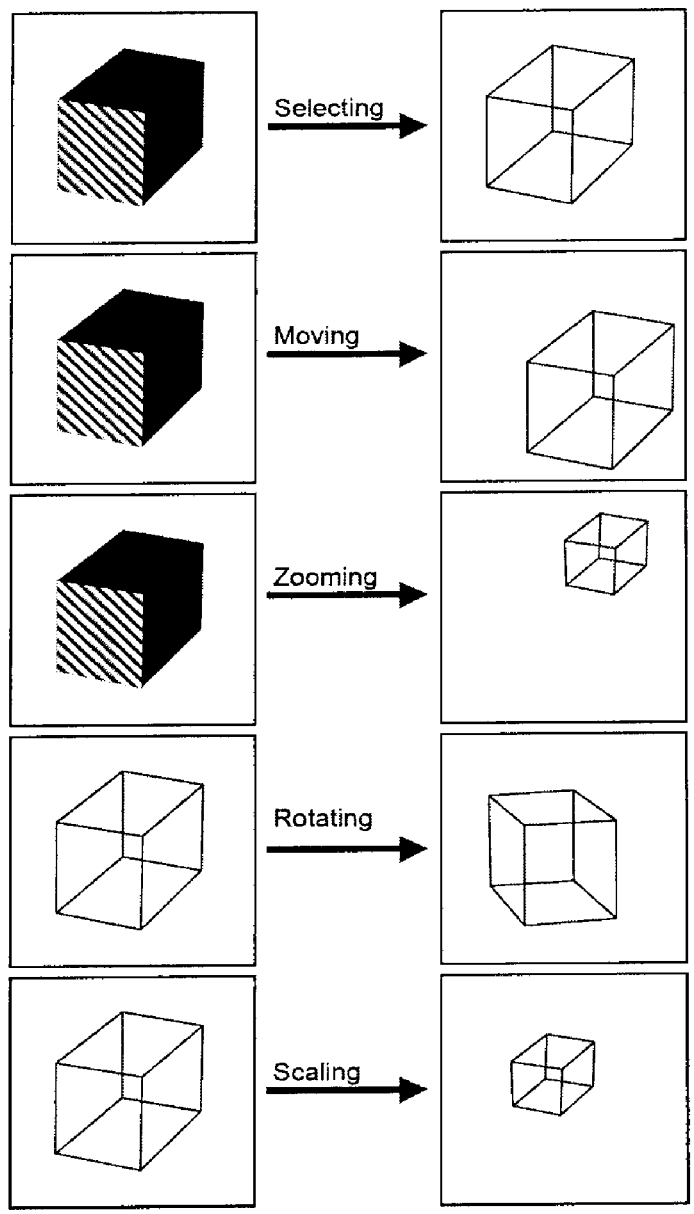
FIG. 5 illustrates manipulation operations of a displayed object, according to an exemplary embodiment.

In exemplary embodiments consistent with the present invention, different manipulation operations may be determined based on the touch events described above. The manipulation operations may include, e.g., selecting, moving, zooming, rotating, or scaling the object, as shown in FIG. 5. In one exemplary embodiment, the host processor coupled to the touch panel controller 200 (FIG. 2A) may determine the manipulation operations based on the touch events. In another exemplary embodiment, the determination of manipulation operations may be coded in an additional hardware logic unit (not shown) coupled to the finger event detector 216 in the touch panel controller 200. For example, the additional hardware logic unit may be located in a graphics or display controller such as the graphics or display controller 234 (FIG. 2B). Also for example, if a number of variables for an application is relatively small, such as when only one object is available for selection, or when only a simple manipulation of a 3D widget or popup menu is needed, the determination of manipulation operations may be coded in the additional hardware logic unit. When the touch panel controller 200 is integrated with a graphics or display controller to form an integrated controller, such as the integrated controller 232 (FIG. 2B), the integrated controller may determine the manipulation operations based on the touch events.

Figure 6:
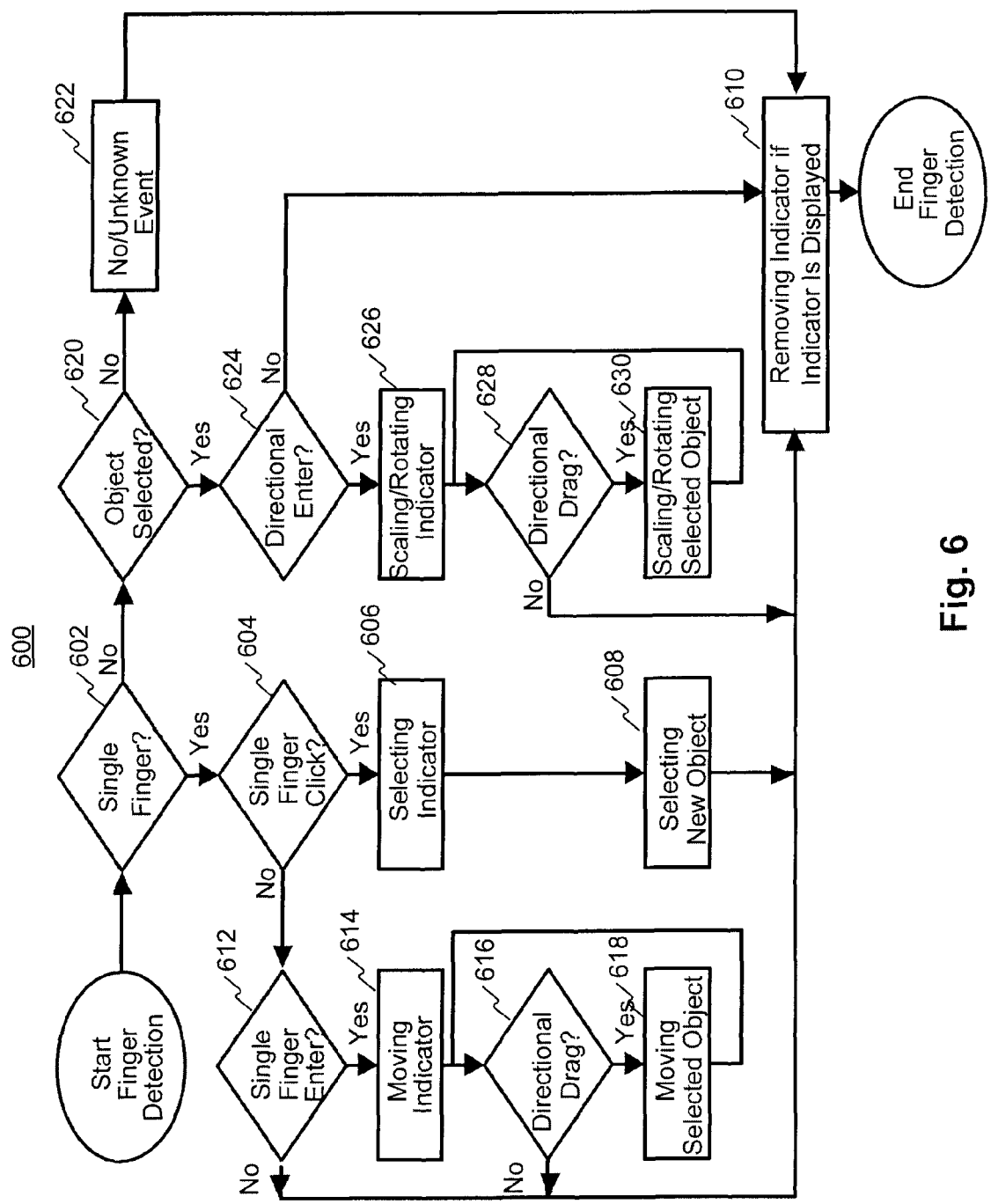
FIG. 6 illustrates a flow chart of a method to detect a manipulation operation, according to an exemplary embodiment.

FIG. 6 illustrates a flow chart of a method 600 to determine a manipulation operation based the touch events, according to an exemplary embodiment. Before carrying out the manipulation operation, a displayed object needs to be selected and identified as a target. To identify the target, a touch on the displayed object needs to trigger a single finger single click event or one of the touch characteristic constructs described above.

For example, referring to FIG. 6, it is determined whether the touch panel is touched 201 (FIG. 2A) by a single finger or multiple fingers (602). If it is determined that the touch panel 201 is touched by a single finger (602—Yes), it is further determined whether the touch is a single finger click event (604). If it is determined that the touch is a single finger click event (604—Yes), a selecting indicator is displayed (606), the object is selected (608), and the indicator is then removed (610). In one exemplary embodiment, the host processor coupled to the touch panel controller 200 (FIG. 2A) may provide an indicator, such as the selecting indicator. In another exemplary embodiment, the touch panel controller 200 may be integrated with a graphics or display controller to form an integrated controller, such as the integrated controller 232 (FIG. 2B), and the integrated controller may provide the indicator.

If it is further determined that the touch is not a single finger click event (604—No), it is further determined whether the touch is a single finger enter event (612). If it is determined that the touch is not a single finger enter event (612—No), an operation for removing a displayed indicator may be performed (610). This operation may be redundant when no indicator is displayed.

If it is determined that the touch is a single finger enter event (612—Yes), a moving indicator is displayed (614). It is further determined whether there is a directional drag event based on following touches on the touch panel 201 (616). If it is determined that there is a directional drag event (616—Yes), the object is moved (618), and step 616 is repeated. Otherwise (616—No), the indicator is removed (610).

If it is determined that the touch panel 201 is not touched by a single finger (602—No), it is further determined whether the object is selected (620). If it is determined that the object is not selected (620—No), it is determined that there is no touch operation or the touch operation is unknown to the touch panel controller 200 (FIG. 2A) (622). In addition, an operation for removing a displayed indicator may be performed (610). This operation may be redundant when no indicator is displayed.

If it is determined that the object is selected (620—Yes), it is further determined whether the touch is a directional enter event (624). If it is determined that the touch is not a directional enter event (624—No), an operation for removing a displayed indicator may be performed (610). This operation may be redundant when no indicator is displayed.

If it is determined that the touch is a directional enter operation (624—Yes), a scaling/rotating indicator is displayed (626). It is further determined whether there is a directional drag event based on following touches on the touch panel 201 (628). If it is determined that there is a directional drag event (628—Yes), the object is scaled or rotated (630), and step 628 is repeated. Otherwise (628—No), the indicator is removed (610).

Figure 7A:
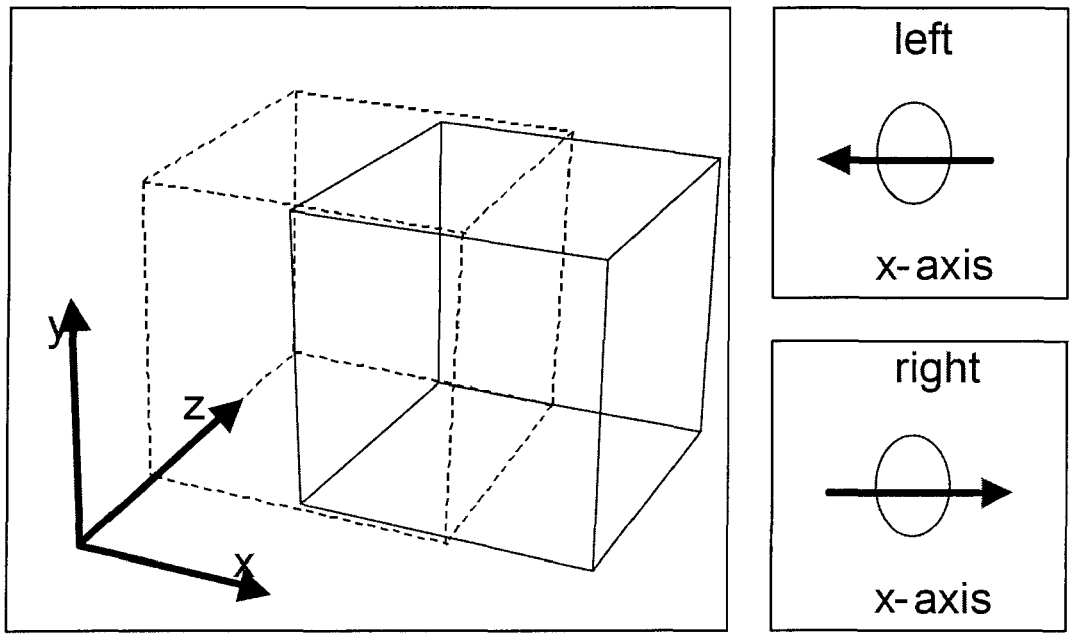
FIGS. 7A-7C illustrate moving operations, according to exemplary embodiments.
Figure 7B:
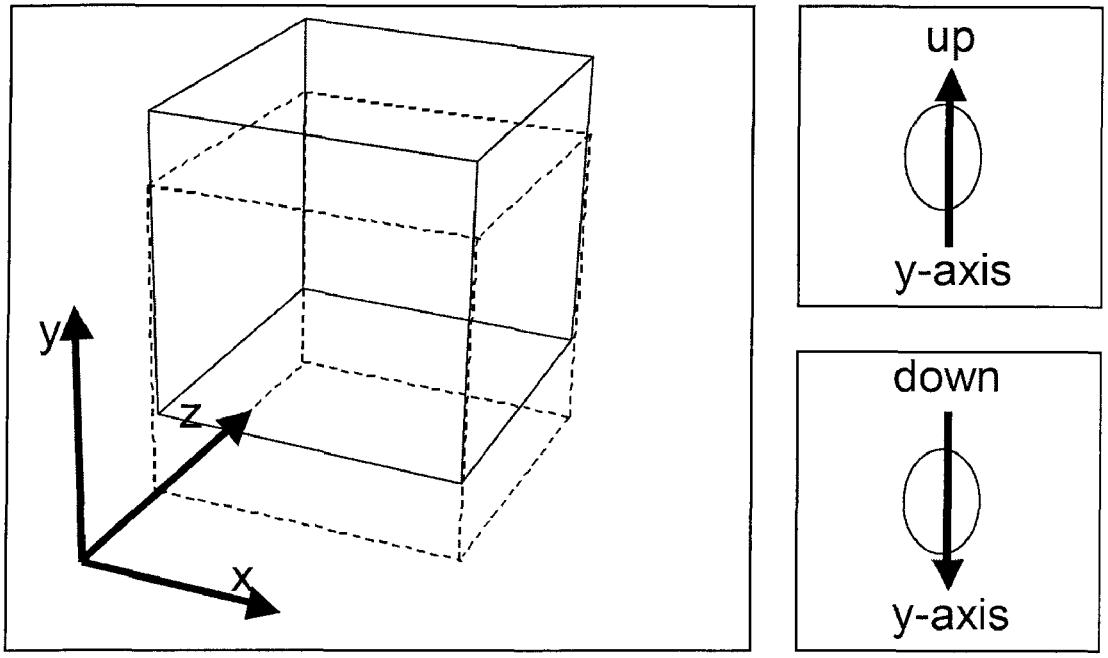
Figure 7C:
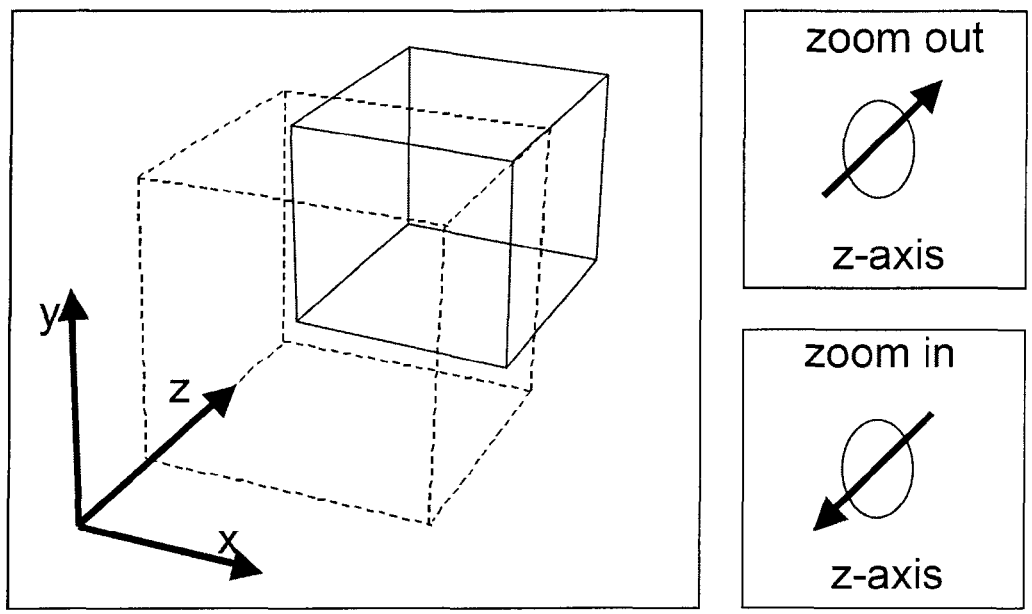

In one exemplary embodiment, the touch characteristic constructs for a single finger are used as user inputs for moving a displayed 3D object. FIGS. 7A-7C illustrate moving operations of the object for the x, y, and z directions in the screen space coordinate system, respectively, according to exemplary embodiments. For example, the moving operations may be triggered by a single finger directional drag event. The moving operation along the z direction (FIG. 7C), defined as a diagonal direction, may become a zooming operation for the object if on a 2D display. The visual indicators on the display are also included in these illustrations, where the placement of the finger is represented by an oval shape and the moving direction is represented by an arrowed line. The object before and after the moving operation is outlined in dotted and solid lines, respectively.

Figure 8A:
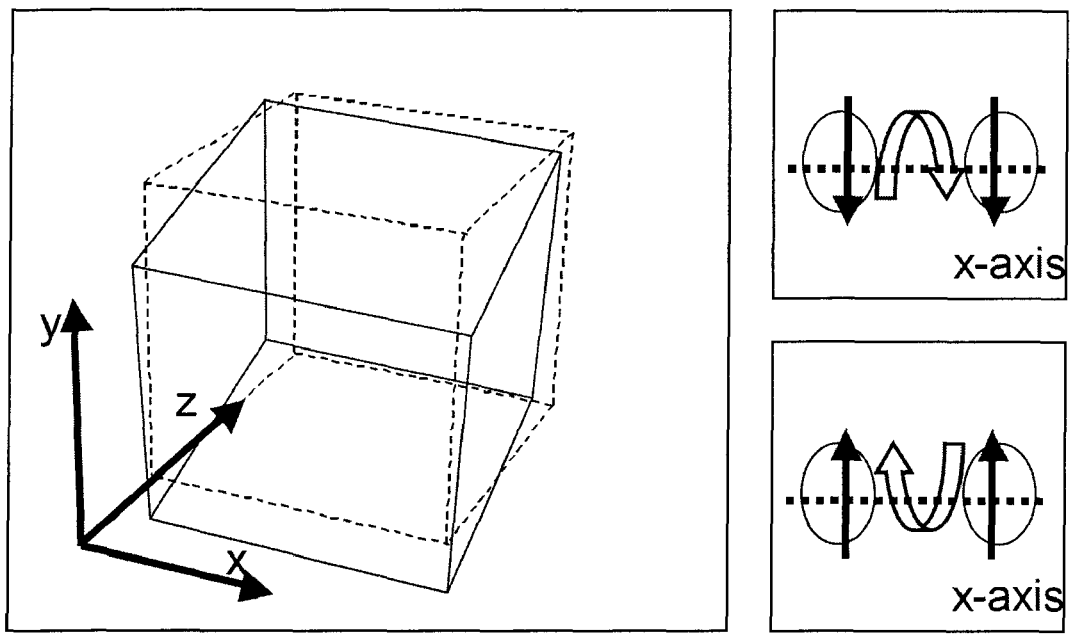
FIGS. 8A-8C illustrate rotating operations, according to exemplary embodiments.
Figure 8B:
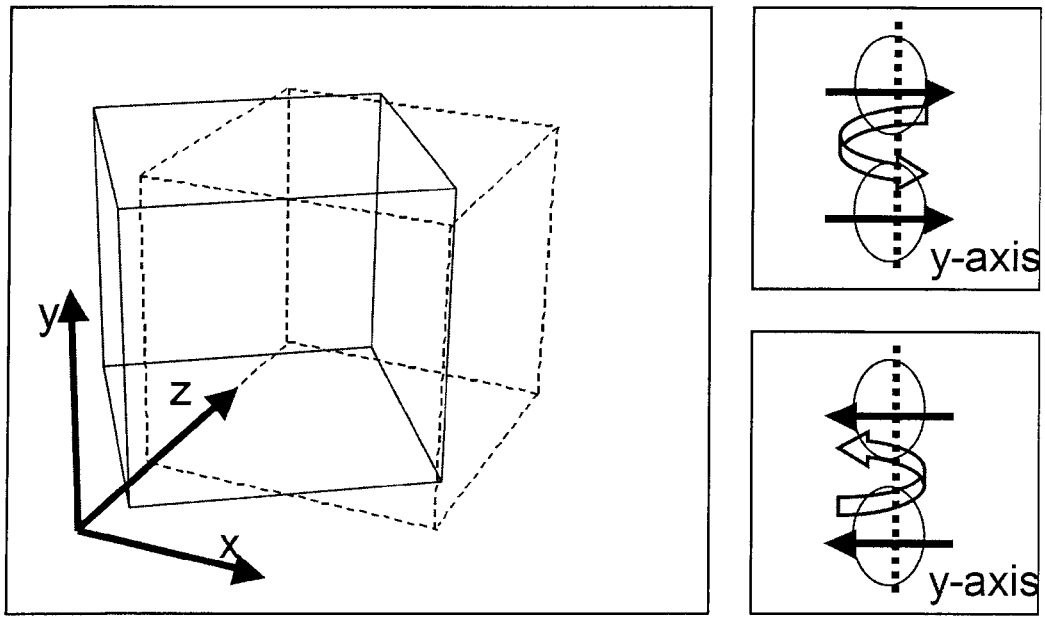
Figure 8C:
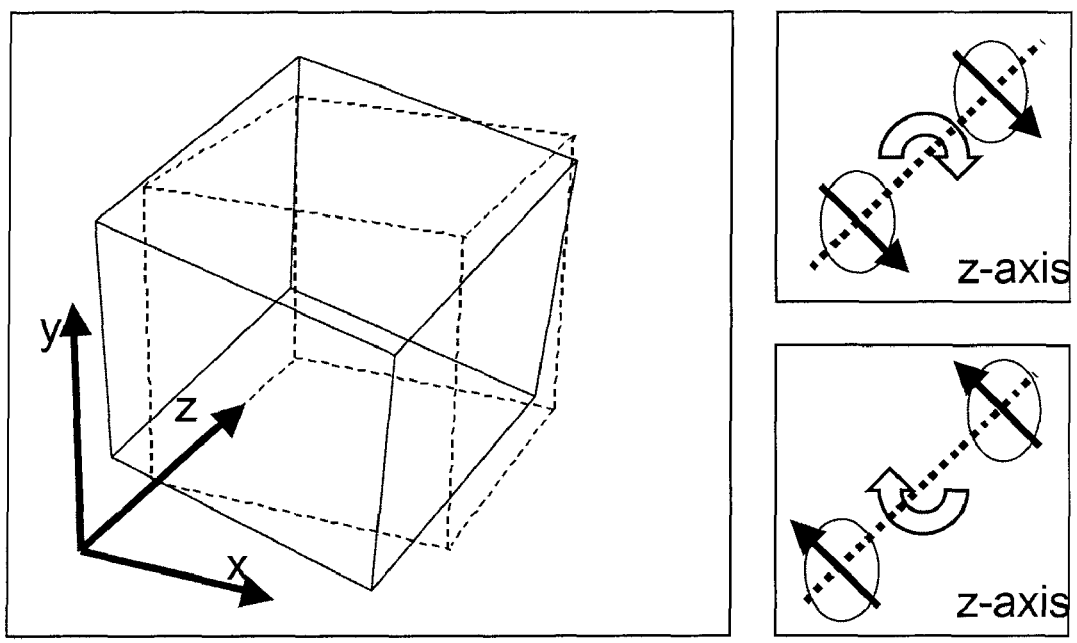
Figure 9A:
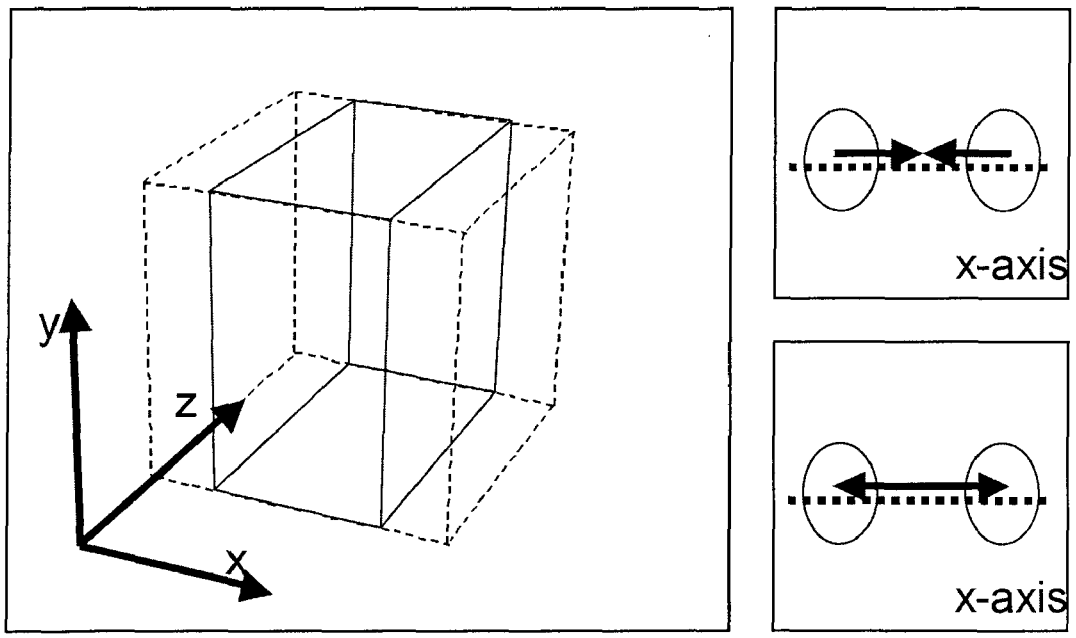
FIGS. 9A-9D illustrate scaling operations, according to exemplary embodiments.
Figure 9B:
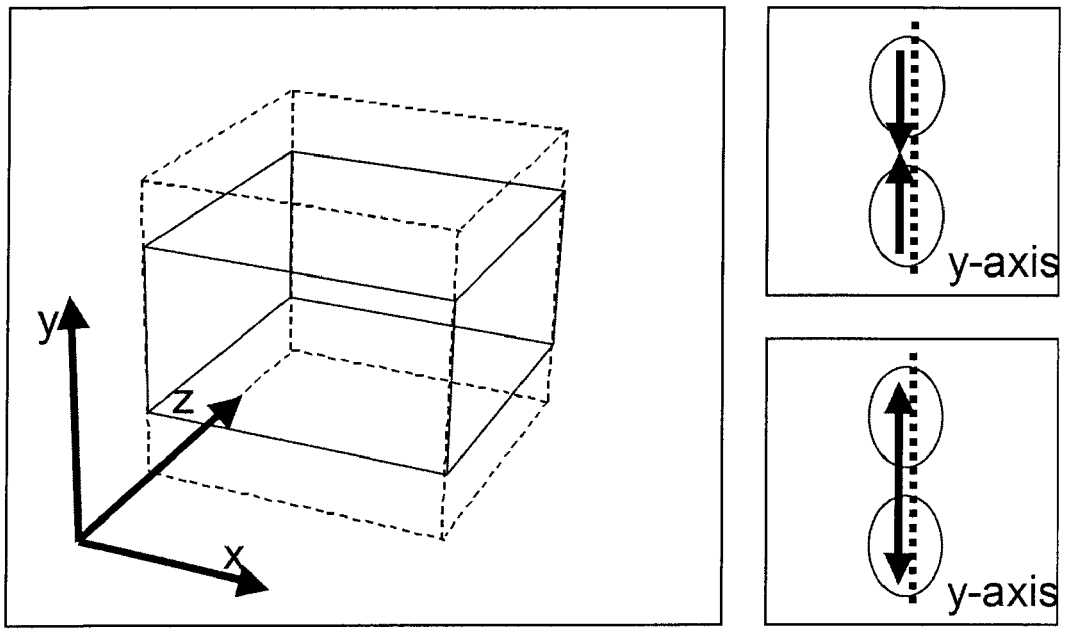
Figure 9C:
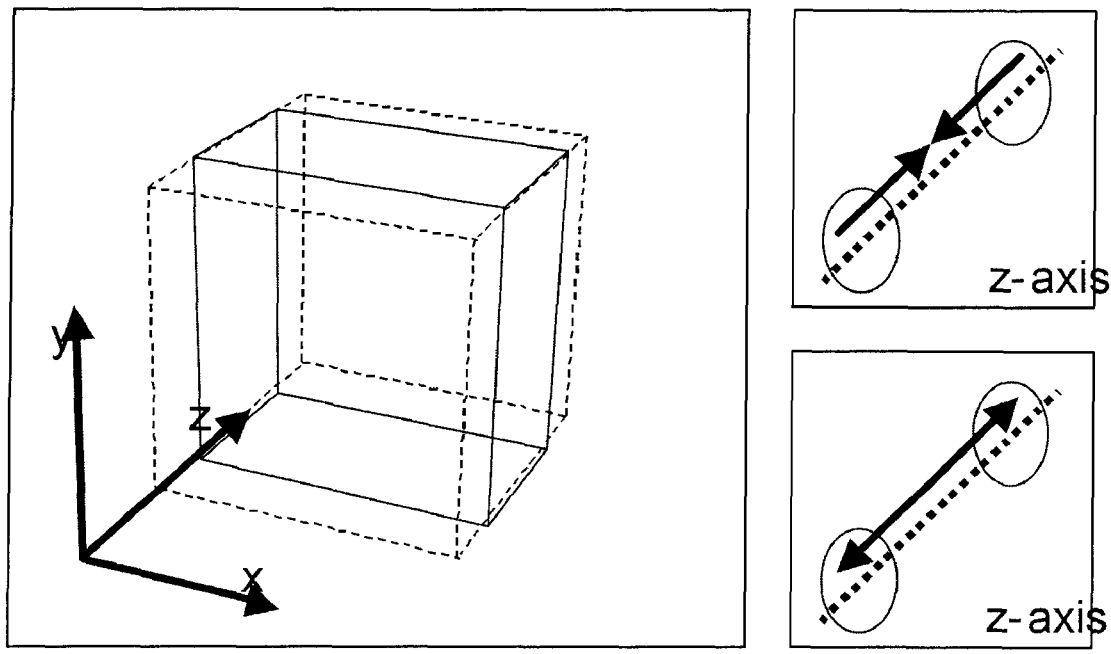
Figure 9D:
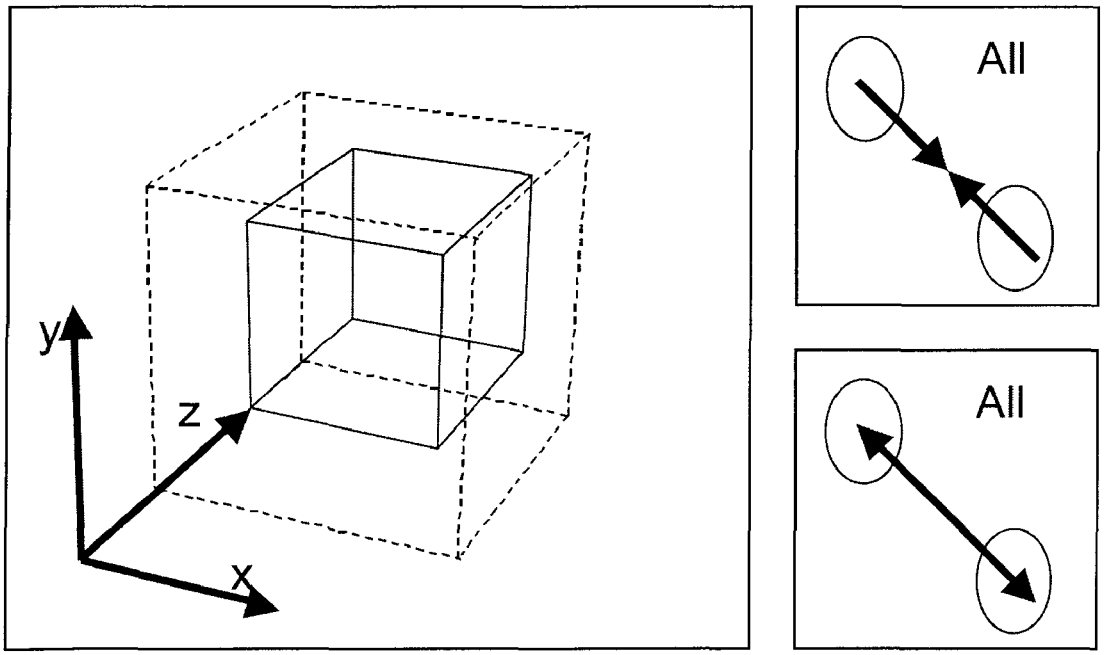

In one exemplary embodiment, the touch constructs for two fingers are used as user inputs for rotating a displayed 3D object. FIGS. 8A-8C illustrate rotating operations of the object about the x, y, and z axes, respectively, according to exemplary embodiments. For example, the rotating operations may be triggered by a double finger directional drag event with a drag direction perpendicular to the indicated axis shown in FIGS. 8A-8C. The visual indicators on the display are also included in these illustrations, where the placements of the fingers are represented by oval shapes and the dragging direction for each finger is represented by an arrowed line with a rotation direction. The object before and after the rotating operation is outlined in dotted and solid lines, respectively.

When the dragging direction is along the same direction of the indicated axis shown in FIGS. 8A-8C, or when the indicated axis is outside of a tolerance limit set for the axis direction, the scaling operation may be triggered. A scaling magnitude is indicated by a drag distance or an amount of change in the separation distance between the two fingers. FIGS. 9A-9D illustrate scaling operations of the object for the x, y, z directions and all directions in the screen space coordinate system, respectively, according to exemplary embodiments. The visual indicators on the display are also included in these illustrations, where the placements of the fingers are represented by oval shapes and the dragging direction for each finger is represented by an arrowed line. The object before and after the scaling operation is outlined in dotted and solid lines, respectively.

Other embodiments of the invention will be apparent to those skilled in the art from consideration of the specification and practice of the invention disclosed here. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A controller for detection of touches by a single finger or multiple fingers on a touch panel, the touch panel including a first group of electrodes arranged in a first direction and a second group of electrodes arranged in a second direction, thereby forming a plurality of crossover points, the controller comprising:
    a plurality of signal drivers coupled to the first group of electrodes and configured to excite the first group of electrodes sequentially using a spread spectrum driving signal provided by an analog waveform generator using no code division multiplexing;
    a plurality of signal sensors coupled to the second group of electrodes and configured to detect peaks and troughs of capacitive coupled signals at the second group of electrodes, the detecting being performed simultaneously for the crossover points along a current one of the first group of electrodes that is being excited; and
    a signal processing device comprising an analog to digital converter (ADC) to convert analog signals from the signal sensors into digital data and a digital signal processing (DSP) unit configured to compensate the digital data, and to detect the touches, calculate touch positions, and generate touch images based on the compensated digital data, wherein the DSP unit comprises:
        an image segmentation component configured to divide into groups ones of the plurality of crossover points at which the capacitive coupled signals have variations, each of the groups corresponding to an approximated finger touch image, thereby to generate a plurality of approximated finger touch images;
        a finger windowing component configured to reshape the approximated finger touch images to generate reshaped finger touch images; and
        a center of mass calculation component configured to determine the touch positions by determining a center of mass for each of the reshaped finger touch images.

2. The controller of claim 1, wherein the signal processing device further comprises:

a frame scan controller configured to control frame scans of the touch panel by scheduling an exciting sequence for the first group of electrodes and a sampling sequence for the second group of electrodes;

a finger touch tracking unit configured to track touch movements based on the calculated touch positions;

a finger event detector configured to determine predefined touch events for the touches according to characteristics of the touch movements, to generate touch information; and a communication interface configured to output the generated touch information.

3. The controller of claim 1, wherein the waveform generator is further configured to generate a direct current (DC) free waveform as the spread spectrum driving signal.

4. The controller of claim 1, wherein the plurality of signal drivers are each configured to convert the spread spectrum driving signal from a low voltage waveform signal to a high voltage driving signal, the high voltage level being programmable.

5. The controller of claim 1, wherein each of the plurality of signal sensors further comprises:

peak detect and hold circuitry to detect the peaks of the capacitive coupled signals; and trough detect and hold circuitry to detect the troughs of the capacitive coupled signals.

6. The controller of claim 2, wherein the ADC is a 5-bit or 6-bit flash ADC.

7. The controller of claim 2, wherein the ADC is configured to accumulate a plurality of samples of the analog signals at different times, to increase a resolution for the ADC and to average out background noise signals.

8. The controller of claim 2, wherein the frame scan controller is further configured to control the plurality of signal drivers and the plurality of signal sensors to be powered on only during each of the frame scans.

9. The controller of claim 2, wherein the frame scan controller further comprises:

a data arrangement component configured to organize transfer of the digital data away from the ADC; and a scan speed regulation component configured to control the frame scans dynamically and adaptively based on the characteristics of the touch movements.

10. The controller of claim 2, wherein the DSP unit is further configured to obtain reference mutual capacitance data of the crossover points for compensation of the digital data, and calibrate the reference mutual capacitance data during initialization and at various times during operation when no touch is being detected.

11. The controller of claim 10, wherein the DSP unit is further configured to:

subtract the digital data from the reference mutual capacitance data to generate the compensated digital data, if the touch panel is a glass touch panel; and subtract the reference mutual capacitance data from the digital data to generate the compensated digital data, if the touch panel is a plastic touch panel.

12. The controller of claim 2, further configured to determine a plurality of manipulation operations based on the characteristics of the touch movements, wherein the manipulation operations may be applied to a two dimensional (2D) or three dimensional (3D) graphic object.

13. The controller of claim 12, further configured to provide a visual indicator for indicating information regarding the manipulation operations.

14. The controller of claim 1, further configured to be integrated with a graphics or display controller to form an integrated controller.

15. A method for detection of touches by a single finger or multiple fingers on a touch panel, the touch panel including a first group of electrodes arranged in a first direction and a second group of electrodes arranged in a second direction, thereby forming a plurality of crossover points, the method comprising:

exciting the first group of electrodes sequentially using a spread spectrum driving signal provided by an analog waveform generator using no code division multiplexing;

detecting, as analog signals, peaks and troughs of capacitive coupled signals at the second group of electrodes, the detecting being performed simultaneously for the crossover points along a current one of the first group of electrodes being excited; and converting the analog signals into digital data for digital signal processing, to detect the touches on the touch panel and to determine touch positions and to generate touch images based on compensated digital data, wherein generating the touch images comprises:

dividing into groups ones of the plurality of crossover points at which the capacitive coupled signals have variations, each of the groups corresponding to an approximated finger touch image, thereby to generate a plurality of approximated finger touch images;

reshaping the approximated finger touch images to generate reshaped finger touch images; and determining the touch positions by determining a center of mass for each of the reshaped finger touch images.

16. The method of claim 15, wherein the digital signal processing further comprises:

averaging the digital data;

compensating the averaged digital data for offsets, to determine the touch positions;

tracking the touch positions to determine characteristics of touch movements;

determining predefined touch events for the touches according to the characteristics of the touch movements, thereby to generate touch information; and outputting the generated touch information, wherein the offsets result from inherent variations of mutual capacitance between the first and second groups of electrodes and background noise.

17. The method of claim 15, further comprising generating a direct current (DC) free waveform as the spread spectrum driving signal.

18. The method of claim 16, further comprising:

controlling an exciting sequence for the first group of electrodes; and controlling a sampling sequence for the second group of electrodes.

19. The method of claim 16, further comprising controlling the exciting dynamically and adaptively based on the characteristics of the touch movements.

20. The method of claim 16, further comprising:

detecting a finger enter incident if a finger is placed on the touch panel;

detecting a finger hold incident if a finger is held on the touch panel with or without movement;

detecting a finger leave incident if a finger is withdrawn from the touch panel;

detecting a single click event if a finger enter incident and a finger leave incident are detected for a single finger;

detecting a double click event if two single click events are detected for a single finger;

detecting a directional enter event if at least two finger enter incidents are detected for first and second fingers and the touch positions indicate one of four directions;

detecting a directional click event if at least two click events are detected for first and second fingers and the touch positions indicate one of the four directions;

detecting a drag event if a finger enter incident and a consecutive number of finger hold incidents following that finger enter incident are detected for a single finger; and detecting a directional drag event if at least one drag event is detected for first and second fingers and the touch positions indicate one of the four directions;

wherein the four directions include a horizontal direction, a vertical direction, an upward diagonal direction, and a downward diagonal direction.

21. The method of claim 20, further comprising:

determining a selecting operation for a single click event;

determining a moving operation for a directional drag event;

determining a rotating operation for a directional enter event and a directional drag event following that directional enter event, if a movement of the two fingers is perpendicular to one of the four directions; and determining a scaling operation for a directional enter event and a directional drag event following that directional enter event, if a distance between the two fingers is changed or an average position of the two fingers is changed, wherein the selecting, moving, rotating, and scaling operations may be applied to a two dimensional (2D) or three dimensional (3D) graphic object.

22. The method of claim 20, wherein the single click event and the double click event are further assigned as input functions for object selection and direction selection, respectively.

23. The method of claim 16, further comprising the determining of predefined touch events, wherein the predefined touch events are user-definable and user-programmable.

* * * * *